(12) United States Patent
Kim et al.

(10) Patent No.: US 10,488,713 B2
(45) Date of Patent: Nov. 26, 2019

(54) DISPLAY APPARATUS

(71) Applicant: Samsung Display Co., Ltd., Yongin-si (KR)

(72) Inventors: Hyukjin Kim, Yongin-si (KR); Jaejin Song, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/728,779

(22) Filed: Oct. 10, 2017

(65) Prior Publication Data

US 2018/0101041 A1    Apr. 12, 2018

(30) Foreign Application Priority Data

Oct. 11, 2016  (KR) .................. 10-2016-0131618

(51) Int. Cl.
| | | |
|---|---|---|
| *G02F 1/1339* | (2006.01) | |
| *G02F 1/1333* | (2006.01) | |
| *G02F 1/1368* | (2006.01) | |
| *G02F 1/1362* | (2006.01) | |
| *G02F 1/135* | (2006.01) | |

(52) U.S. Cl.
CPC ........ *G02F 1/13394* (2013.01); *G02F 1/1368* (2013.01); *G02F 1/133305* (2013.01); *G02F 1/133514* (2013.01); *G02F 2001/13396* (2013.01); *G02F 2001/13398* (2013.01); *G02F 2001/136222* (2013.01)

(58) Field of Classification Search
CPC .......... G02F 1/13394; G02F 1/133305; G02F 1/133514; G02F 1/1368; G02F 1/133711; G02F 2001/13396; G02F 2001/13398; G02F 2001/136222
See application file for complete search history.

(56) References Cited

U.S. PATENT DOCUMENTS

| | | | |
|---|---|---|---|
| 2013/0101755 A1* | 4/2013 | Lee ................... | G02F 1/133707 428/1.23 |
| 2015/0116621 A1 | 4/2015 | Park et al. | |
| 2015/0198844 A1 | 7/2015 | Choi et al. | |
| 2015/0370116 A1* | 12/2015 | Chae ................... | G02F 1/13394 349/43 |
| 2016/0103353 A1 | 4/2016 | Kim | |
| 2017/0235177 A1* | 8/2017 | Xie ................... | G02F 1/133514 349/106 |

FOREIGN PATENT DOCUMENTS

| | | |
|---|---|---|
| KR | 10-2015-0049536 | 5/2015 |
| KR | 10-1552902 | 9/2015 |
| KR | 10-2016-0043328 | 4/2016 |

* cited by examiner

*Primary Examiner* — Angela K Davison
(74) *Attorney, Agent, or Firm* — H.C. Park & Associates, PLC

(57) ABSTRACT

A display apparatus including: a lower substrate bent around a first bending axis that extends in a first direction; an upper substrate opposing the lower substrate and having a first surface facing the lower substrate; a pixel electrode disposed on the lower substrate; a color filter disposed on the lower substrate so as to correspond to the pixel electrode; and a first column spacer disposed on the first surface so as to correspond to at least a portion of the color filter and extending in a second direction that intersects the first direction.

13 Claims, 5 Drawing Sheets

DISPLAY APPARATUS

CROSS-REFERENCE TO RELATED APPLICATION

This application claims priority from and the benefit of Korean Patent Application No. 10-2016-0131618, filed on Oct. 11, 2016, which is hereby incorporated by reference for all purposes as if fully set forth herein.

BACKGROUND

Field

Exemplary embodiments relate to a display apparatus. More particularly, exemplary embodiments relate to a display apparatus that may be manufactured by a simplified process having a reduced defect rate.

Discussion of the Background

As various electronic devices, such as mobile phones, personal digital assistants (PDAs), computers, and large TVs, have been developed, the demand for display apparatuses applicable to such electronic devices has increased. Among display apparatuses, liquid crystal display (LCD) apparatuses have advantages in terms of low power consumption, easy display of moving images, and a high contrast ratio.

LCD apparatuses include a liquid crystal layer between an upper substrate and a lower substrate and generate a transmittance difference by changing an orientation of liquid crystal molecules by applying an electric field to the liquid crystal layer. LCD apparatuses have been implemented as any of various apparatuses, such as flat-panel display apparatuses, curved display apparatuses, or flexible display apparatuses, in accordance with recent trends in technology.

A conventional LCD display apparatus has a problem in that an additional process is required to align an upper substrate and a lower substrate in a process of adhering the upper substrate and the lower substrate.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display apparatus that may simplify a process and may minimize a defect rate in a manufacturing process.

Additional aspects will be set forth in the detailed description which follows, and, in part, will be apparent from the disclosure, or may be learned by practice of the inventive concept.

An exemplary embodiment discloses a display apparatus, including: a lower substrate bent around a first bending axis that extends in a first direction; an upper substrate opposing the lower substrate and having a first surface facing the lower substrate; a pixel electrode disposed on the lower substrate; a color filter disposed on the lower substrate so as to correspond to the pixel electrode; and a first column spacer disposed on the first surface so as to correspond to at least a portion of the color filter and extending in a second direction that intersects the first direction The first direction and the second direction may be perpendicular to each other.

The upper substrate may be bent around a second bending axis extending in a third direction that intersects the second direction.

The third direction may be parallel to the first direction.

The lower substrate may be bent according to a first curvature, and the upper substrate may be bent according to a second curvature different from the first curvature.

The first curvature of the lower substrate may be greater than the second curvature of the upper substrate.

The pixel electrode may extend in the first direction.

The color filter may include at least one from among a red color filter, a blue color filter, a green color filter, and a white color filter.

The color filter may not overlap at least a portion of the first column spacer.

The first column spacer may include a first portion that overlaps the color filter and second portions that do not overlap the color filter The first portion may be located at a center of the first column spacer.

The second portions may be located at two sides of the first portion.

The display apparatus may further include an organic film disposed between the color filter and the first column spacer.

The first portion of the first column spacer may contact the organic film.

The display apparatus may further include a second column spacer disposed farther from a central axis of the upper substrate that is parallel to the second bending axis than the first column spacer, wherein a second length of the second column spacer in the second direction is greater than a first length of the first column spacer in the second direction.

The display apparatus may further include a second column spacer located farther from a central axis of the upper substrate than the first column spacer, the central axis of the upper substrate being parallel to the second bending axis, wherein a second height of the second column spacer is greater than a first height of the first column spacer.

An exemplary embodiment also discloses a display apparatus including: a lower substrate bent around a first bending axis that extends in a first direction; an upper substrate opposing the lower substrate and having a first surface facing the lower substrate; a column spacer disposed on the first surface of the upper substrate and including a first portion and a second portion that contacts the first portion; and a color filter located on the lower substrate so that the first portion overlaps the column spacer.

The lower substrate may be bent around a first bending axis that extends in a first direction.

The column spacer may extend in a second direction that intersects the first direction.

A thickness of the first portion may be greater than a thickness of the second portion.

The display apparatus may further include an organic film disposed between the color filter and the column spacer, wherein the first portion contacts the organic film.

The present disclosure may be embodied within a system, a method, a computer program, or any combination thereof.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
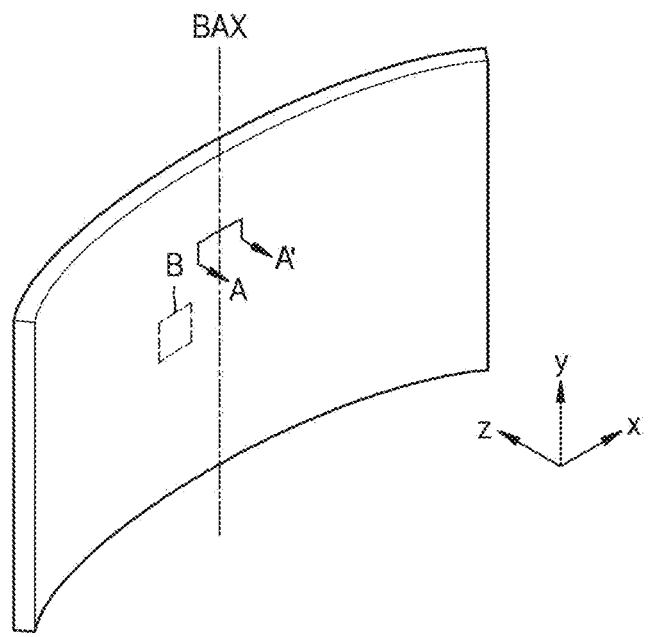
FIG. 1 is a perspective view of a display apparatus according to an embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
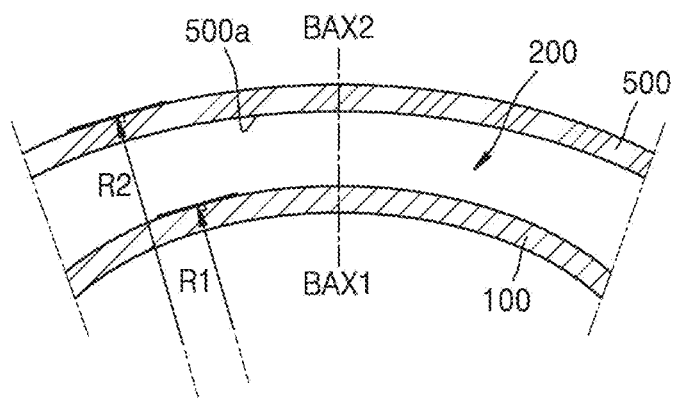
FIG. 2 is a cross-sectional view taken along line A-A' of the display apparatus of FIG. 1.

FIG. 1 is a perspective view of a display apparatus according to an embodiment. FIG. 2 is a cross-sectional view taken along line A-A' of the display apparatus of FIG. 1.

Referring to FIG. 1, the display apparatus of an exemplary embodiment has a bent shape, as shown in FIG. 1. When the display apparatus has a bent shape, it may mean that a lower substrate 100 and an upper substrate 500 of the display apparatus are bent. A display apparatus having a bent shape may be formed by forming various layers on a substrate having a flat shape and bending the substrate, or may be formed by forming various layers on a bent substrate. However, for convenience, the display apparatus is illustrated as not being bent in some drawings.

The display apparatus according to an exemplary embodiment may be bent around a bending axis BAX that extends in one direction as shown in FIG. 1. In an exemplary embodiment, the bending axis BAX may extend in a first direction (e.g., a +y direction).

Referring to FIG. 2, the display apparatus according to an exemplary embodiment includes the lower substrate 100 and the upper substrate 500 opposing the lower substrate 100. A liquid crystal layer 200 may be located between the lower substrate 100 and the upper substrate 500. The lower substrate 100 may be bent around a first bending axis BAX1 that extends in the first direction (e.g., the +y direction). The upper substrate 500 may be bent around a second bending axis BAX2 that extends in a third direction (e.g., the +y direction). In an exemplary embodiment, the first direction (e.g., the +y direction) in which the first bending axis BAX1 of the lower substrate 100 extends may be the same as the third direction (e.g., the +y direction) in which the second bending axis BAX2 of the upper substrate 500 extends, and thus, the first bending axis BAX1 and the second bending axis BAX2 may be parallel to each other.

In the display apparatus according to an exemplary embodiment, the lower substrate 100 and the upper substrate 500 may be curved, as shown in FIG. 2. The lower substrate 100 and the upper substrate 500 may be adhered to each other and may be curved. In this case, curvatures of the lower substrate 100 and the upper substrate 500 may be different from each other. That is, the lower substrate 100 may have a first radius of curvature R1, and the upper substrate 500 may have a second radius of curvature R2.

In an exemplary embodiment, the first radius of curvature R1 of the lower substrate 100 may be less than the second radius of curvature R2 of the upper substrate 500. In other words, a curvature of the lower substrate 100 may be greater than a curvature of the upper substrate 500. That is, since the lower substrate 100 is closer to the center with respect to curvatures of the lower substrate 100 and the upper substrate, a curvature of the lower substrate 100 may be greater than a curvature of the upper substrate 500.

Figure 3:
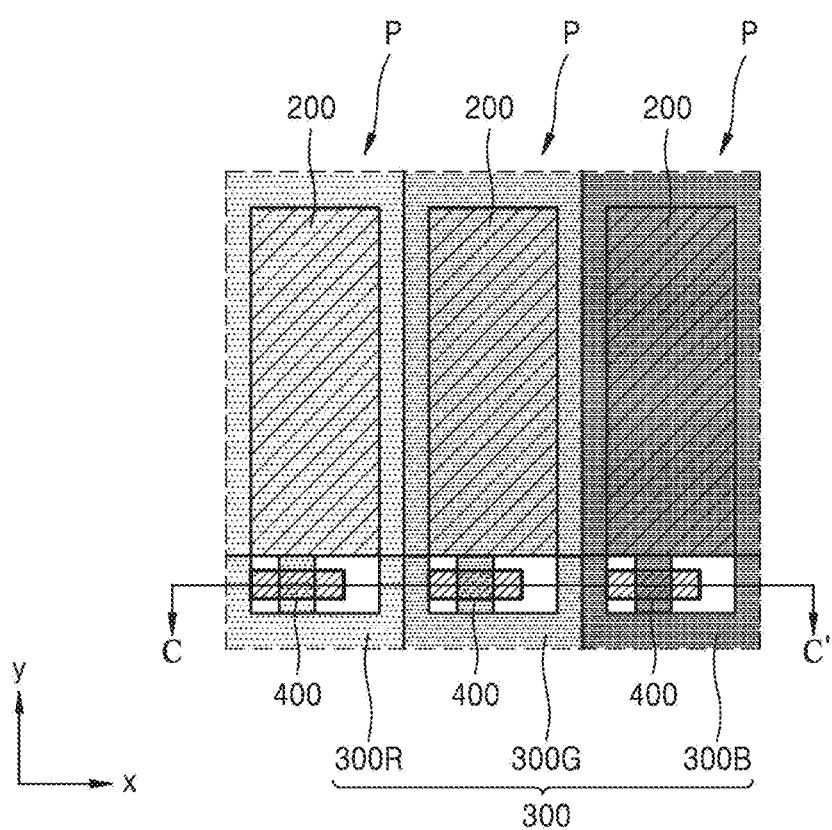
FIG. 3 is an enlarged plan view of a portion B of FIG. 1.
Figure 4:
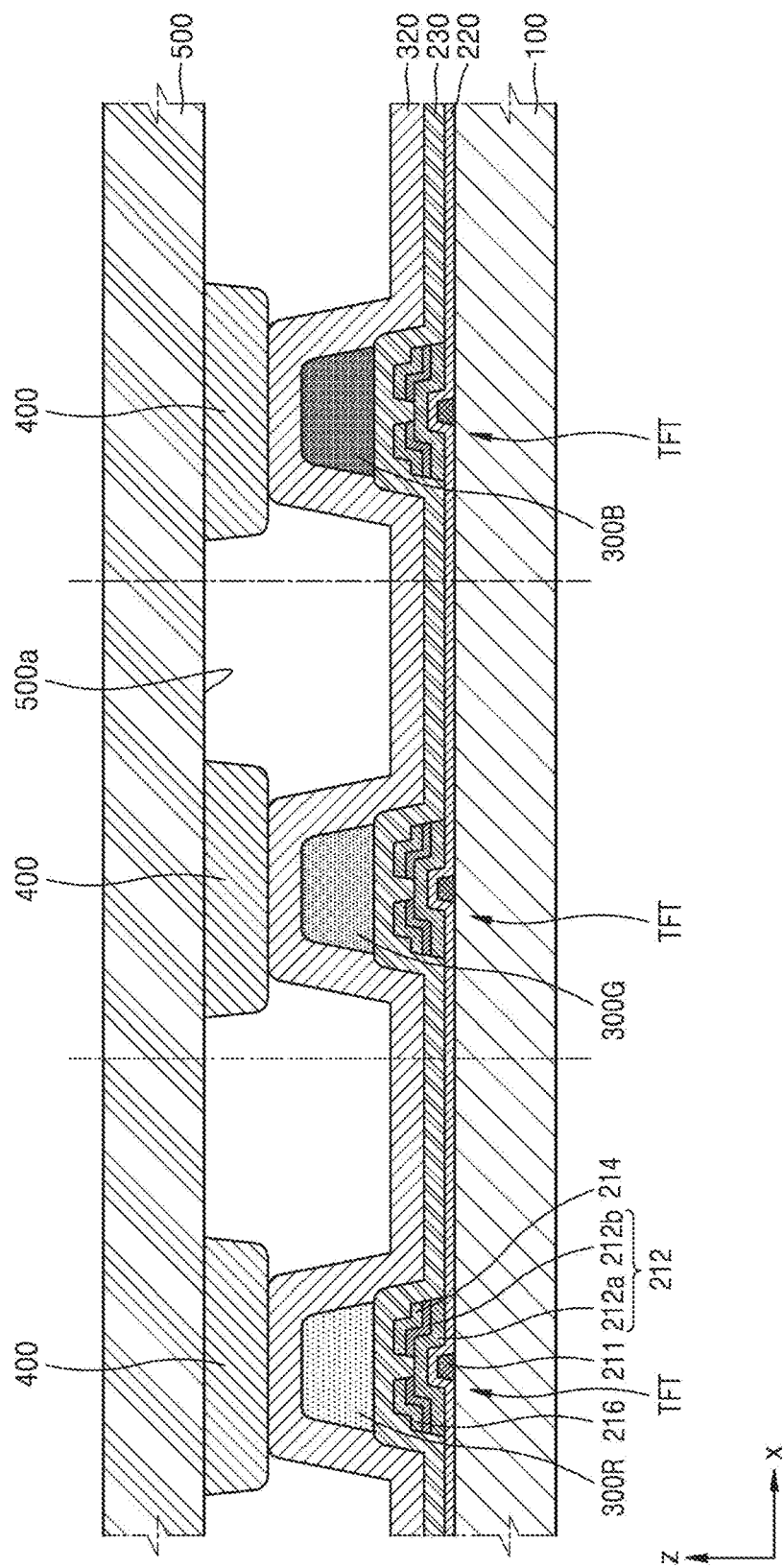
FIG. 4 is a cross-sectional view taken along line C-C' of FIG. 3.

FIG. 3 is an enlarged plan view of a portion B of FIG. 1. FIG. 4 is a cross-sectional view taken along line C-C' of FIG. 3.

Referring to FIGS. 3 and 4, the display apparatus according to an exemplary embodiment may include a plurality of sub-pixels. FIG. 3 illustrates the plurality of sub-pixels including a color filter 300 for emitting light of different colors. Each of the plurality of sub-pixels may be located in a pixel region P. The lower substrate 100 may have the pixel regions P.

The lower substrate 100 may be flexible and may be formed of plastic having high heat resistance and high durability.

The upper substrate 500 may be located over the lower substrate 100 so as to oppose the lower substrate 100. The lower substrate 100 and the upper substrate 500 may face each other, and the upper substrate 500 may have a first surface 500a facing the lower substrate 100. Similar to the lower substrate 100, the upper substrate 500 may be flexible and may be formed of plastic having high heat resistance and high durability.

For example, each of the lower substrate 100 and the upper substrate 500 may include any one selected from the group consisting of polyethersulfone (PES), polyacrylate (PA), polyetherimide (PEI), polyethylene naphthalate (PEN), polyethylene terephthalate (PET), polyphenylene sulfide (PPS), polyarylate (PAR), polyimide (PI), polycarbonate (PC), cellulose triacetate, cellulose acetate propionate (CAP), poly(arylene ether sulfone), and a combination thereof. However, the present disclosure is not limited thereto, and each of the lower substrate 100 and the upper substrate 500 may be formed of any of various materials, such as a metal or glass. The lower substrate 100 and the upper substrate 500 may be formed of the same material or different materials.

A gate line (not shown), a gate electrode 211, and a common line (not shown) are located on the lower substrate 100. The gate line extends in one direction, and the gate electrode 211 is connected to the gate line. The gate electrode 211 may extend from the gate line, or may be a part of the gate line.

Each of the gate electrode 211 and the gate line may be formed to have a single-layered structure or a multi-layered structure by using at least one material selected from the group consisting of, for example, aluminum (Al), platinum (Pt), palladium (Pd), silver (Ag), magnesium (Mg), gold (Au), nickel (Ni), neodymium (Nd), iridium (Jr), chromium (Cr), lithium (Li), calcium (Ca), molybdenum (Mo), titanium (Ti), tungsten (W), and copper (Cu), in consideration of an adhesive force with an adjacent layer, a surface flatness of a stacked layer, and workability.

The common line may extend in the one direction so as to be parallel to the gate line.

A gate insulating film 220 may be located on the gate line, the gate electrode 211, and the common line. The gate insulating film 220 may have a single-layered structure or a multi-layered structure by using, for example, silicon oxide and/or silicon nitride.

A semiconductor layer 212 may be located on the gate insulating film 220, which is located on the gate electrode 211. The semiconductor layer 212 may include an active layer 212a formed of amorphous silicon and an ohmic contact layer 212b formed of amorphous silicon doped with impurities.

A source electrode 214 and a drain electrode 216 may be located on the semiconductor layer 212. The source electrode 214 and the drain electrode 216 may be spaced apart from each other, and a portion of the active layer 212a may be exposed between the source electrode 214 and the drain electrode 216. In this case, the ohmic contact layer 212b may have the same shape as that of the source electrode 214 and the drain electrode 216.

Each of the source electrode 214 and the drain electrode 216 may be formed to have a single-layered structure or a multi-layered structure by using at least one material selected from the group consisting of, for example, Al, Pt, Pd, Ag, Mg, Au, Ni, Nd, Jr, Cr, Li, Ca, Mo, Ti, W, and Cu, in consideration of conductivity or the like.

The gate electrode 211, the semiconductor layer 212, the source electrode 214, and the drain electrode 216 constitute a thin-film transistor (TFT), and the portion of the active layer 212a exposed between the source electrode 214 and the drain electrode 216 form a channel of the TFT.

A data line (not shown) may be formed on the same layer as the source electrode 214 and the drain electrode 216 by using the same material as those of the source electrode 214 and the drain electrode 216. The data line extends in a direction that intersects or is perpendicular to the one direction, and defines the pixel region P by intersecting the gate line. The data line may be connected to the source electrode 214.

A protective layer 230 is formed on the source electrode 214 and the drain electrode 216. The protective layer 230 may have a single-layered structure or a multi-layered structure by using, for example, silicon oxide and/or silicon nitride.

The color filter 300 may be located on the protective layer 230. The color filter 300 may be located in the pixel region P so as to correspond to a pixel electrode. The color filter 300 may include at least one from among a red color filter 300R, a blue color filter 300B, a green color filter 300G, and a white color filter, which may respectively correspond to each pixel region P. Although the red color filter 300R, the green color filter 300G, and the blue color filter 300B are sequentially arranged in a +x direction in FIG. 3, the present disclosure is not limited thereto, and the color filters of the color filter 300 may be arranged in various ways.

Although not shown, a light-shielding layer may be located between color filters of the color filter 300.

An organic film 320 may be located on the color filter 300. The organic film 320 may protect various elements or lines, such as the color filter 300 and the TFT. The organic film 320 may be formed to have a single-layered structure or a multi-layered structure by using an acryl-based polymer such as polymethylmethacrylate (PMMA), polystyrene (PS), a polymer derivative having a phenol group, an imide-based polymer, an aryl ether-based polymer, an amide-based polymer, a fluorine-based polymer, a p-xylene-based polymer, a vinyl alcohol-based polymer, or a mixture thereof.

A column spacer 400 may be located on the first surface 500a of the upper substrate 500. The first surface 500a of the upper substrate 500 facing the lower substrate 100 may be formed by forming the column spacer 400 on the first surface 500a of the upper substrate 500, and the upper substrate 500 may be adhered to the lower substrate 100 such that the first surface 500a on which the column spacer 400 is formed faces the lower substrate 100.

Although the column spacer 400 is located in each sub-pixel in FIG. 3, the column spacers 400 may be located in only some sub-pixels.

The column spacer 400 may maintain a cell gap, that is, an interval between the lower substrate 100 and the upper substrate 500. The column spacer 400 of an exemplary embodiment may be a main column spacer for maintaining a cell gap, and although not shown, when pressure is applied to the upper substrate 500 or the lower substrate 100, an auxiliary column spacer for preventing deformation may be further provided. The column spacer 400 of an exemplary embodiment is a main column spacer and may directly contact the organic film 320 that is an uppermost layer in a structure of the lower substrate 100 as shown in FIG. 4. However, the auxiliary column spacer may be spaced by a predetermined interval from the organic film 320 that is the uppermost layer in the structure of the lower substrate 100.

Since the organic film 320 is the uppermost layer in the structure of the lower substrate 100 in an exemplary embodiment, the column spacer 400 contacts the organic film 320. However, when another layer is located on the uppermost layer in the structure on the lower substrate 100 according to another exemplary embodiment, the column spacer 400 may contact the other layer.

The column spacer 400 may have a rectangular shape having a long axis and a short axis as shown in FIG. 3. However, a shape of the column spacer 400 is not limited thereto, and the column spacer 400 may have any of other shapes as long as the column spacer 400 has a long axis that extends in one direction.

The column spacer 400 according to an exemplary embodiment may extend in a second direction (e.g., the +x direction). The second direction (e.g., the +x direction) may intersect the first direction (e.g., the +y direction) and may intersect a direction in which the first bending axis BAX1 extends. The second direction (e.g., the +x direction) may be perpendicular to the first direction (e.g., the +y direction) in an exemplary embodiment. In other words, the column spacer 400 may extend in a direction that intersects or is perpendicular to a direction in which the first bending axis BAX1 extends.

Figure 5:
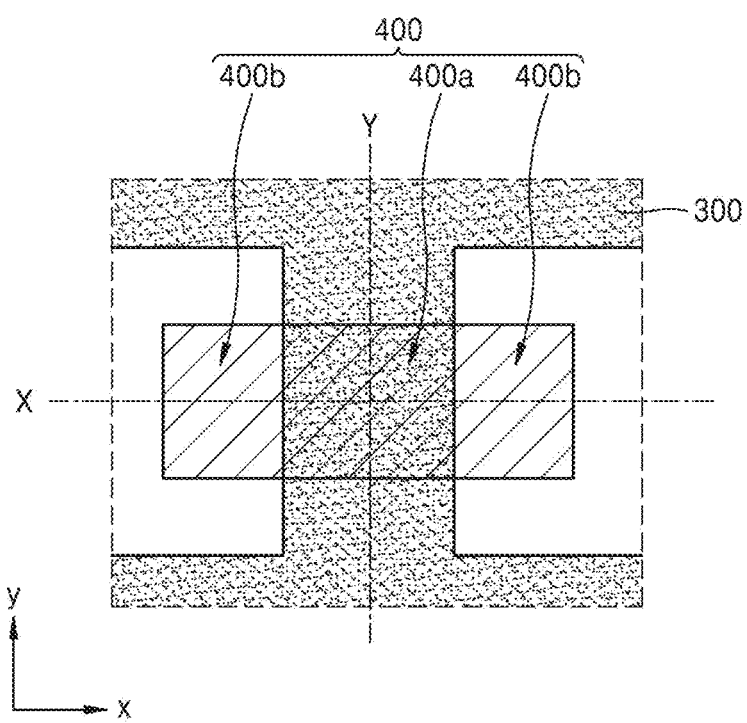
FIG. 5 is an enlarged partial plan view of FIG. 3.

FIG. 5 is an enlarged partial plan view of FIG. 3.

FIG. 5 is an enlarged view illustrating the column spacer 400 and a peripheral portion near the column spacer 400 of FIG. 3. FIG. 5 illustrates the color filter 300 overlapping a part of the column spacer 400, and the color filter 300 may be at least one from among a red color filter, a blue color filter, a green color filter, and a white color filter.

Referring to FIGS. 5 and 3, the column spacer 400 may not overlap at least a portion of the color filter 300. That is, the column spacer 400 may include a first portion 400a and second portions 400b contacting the first portion 400a. The first portion 400a may be a portion of the column spacer 400 that overlaps the color filter 300, and the second portions 400b may be portions of the column spacer 400 that do not overlap the color filter 300.

As described above, the first portion 400a may be defined as a portion of the column spacer 400 that overlaps the color filter 300, and the second portions 400b may be defined as portions of the column spacer 400 that do not overlap the color filter 300. It may be understood that the color filter 300 is not located in at least a portion of the pixel region P. That is, there is a portion of the pixel region P in which the color filter 300 is not located, and portions of the column spacer 400 located in this portion of the pixel region P are defined as the second portions 400b. The color filter 300 is not located on the second portions 400b, and the second portions 400b may be portions of the column spacer 400 that do not overlap the color filter 300. As such, the first portion 400a may be defined as an overlapping portion, and the second portions 400b may be defined as margin portions.

As shown in FIG. 5, the first portion 400a that is an overlapping portion may be located at the center of the column spacer 400, and the second portions 400b that are margin portions may be located at two sides of the first portion 400a. Although the second portions 400b are provided at two sides of the first portion 400 and have the same width in FIG. 5, according to another exemplary embodiment, the second portions 400b may be located only at one side of the first portion 400a, or the second portions 400b may be located at two sides of the first portion 400a and have different widths different from each other.

The column spacer 400 maintains a cell gap between the lower substrate 100 and the upper substrate 500 as described above. To this end, the column spacer 400 is formed to contact a layer that protrudes the most from among layers of the lower substrate 100. In an exemplary embodiment, the first portion 400a of the column spacer 400 overlaps a circuit unit including the TFT located on the lower substrate 100 and the color filter 300 located on the circuit unit, and directly contacts the organic film 320 that covers the color filter 300.

The column spacer 400 according to an exemplary embodiment is located on the first surface 500a of the upper substrate 500. Since the column spacer 400 is located on the upper substrate 500, the display apparatus having a bent shape, as shown in FIG. 1, may suffer misalignment in a process of bending the lower substrate 100 and the upper substrate 500. This is because a curvature of the lower substrate 100 and a curvature of the upper substrate 500 differ in the actual process of bending the lower substrate 100 and the upper substrate 500. Even though the color filter 300 located on the lower substrate 100 and the column spacer 400 located on the upper substrate 500 are aligned with each other before bending, since curvatures of the lower substrate 100 and the upper substrate 500 are different from each other, the color filter 300 and the column spacer 400 may be misaligned with each other in a process of bending the lower substrate 100 and the upper substrate 500.

Accordingly, in a conventional curved display apparatus of the related art, this problem is solved by forming a column spacer on a lower substrate. However, once the column spacer is formed on the lower substrate, since the column spacer has to be formed on an uppermost layer from among layers formed on the lower substrate, when a height of the uppermost layer from among the layers formed on the lower substrate is excessively large, the column spacer falls downward to a peripheral portion, thereby making it difficult to form the column spacer with a sufficient height. Furthermore, when a width of an uppermost portion of the column spacer is not sufficiently large, the column spacer falls downward to a peripheral portion, thereby making it difficult to form the column spacer with a sufficient height.

In the display apparatus according to an exemplary embodiment, the column spacer 400 may be formed on the upper substrate 500, and the column spacer 400 may extend in the second direction (e.g., the +x direction) that intersects the bending axis BAX, in order to prevent misalignment of the column spacer 400 in a process of bending the upper substrate 500 and the lower substrate 100.

The first portion 400a of the column spacer 400 that overlaps the color filter 300 may contact the organic film 320 located on the color filter 300 and may maintain a cell gap between the lower substrate 100 and the upper substrate 500. The second portions 400b of the column spacer 400 that do not overlap the color filter 300 may act as aligning margin portions for preventing misalignment when the column spacer 400 is moved during bending. Since the column spacer 400 has aligning margin portions as in an exemplary embodiment, a misalignment rate may be minimized and the display apparatus having a curved shape may be realized.

Figure 6:
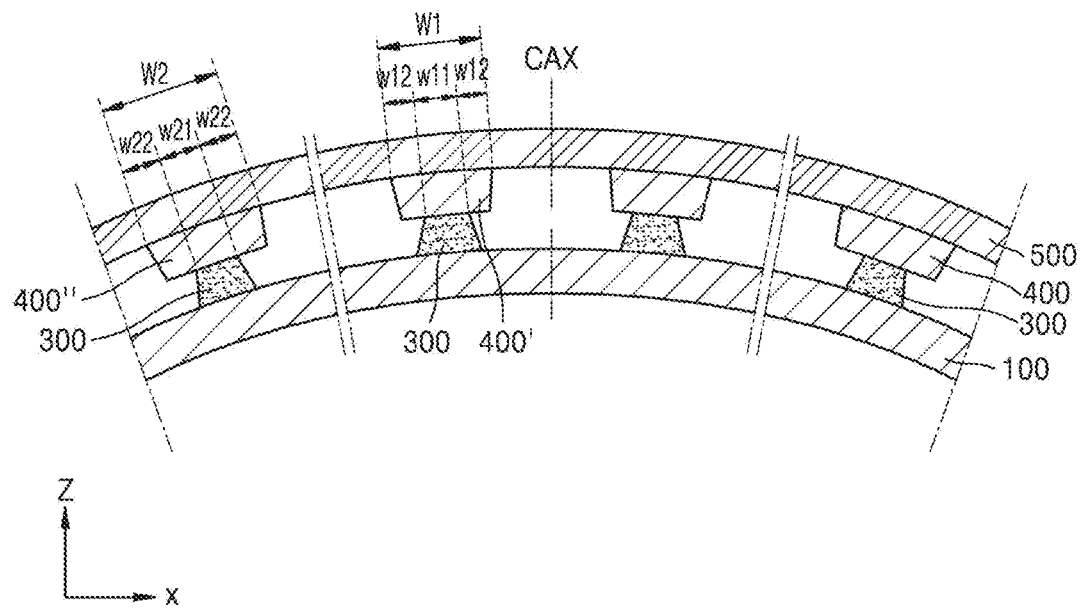
FIG. 6 is a cross-sectional view of the display apparatus of FIG. 1 according to an exemplary embodiment.

FIG. 6 is a cross-sectional view of the display apparatus of FIG. 1 according to an exemplary embodiment.

In FIG. 6, the display apparatus is curved. A plurality of column spacers 400 may be located on the upper substrate 500, and a plurality of color filters 300 may be located on the lower substrate 100. The plurality of column spacers 400 and the plurality of color filters 300 may face each other. Although the plurality of color filters 300 are directly located on an upper surface of the lower substrate 100 in FIG. 6, it will be understood that a device layer including various lines such as a TFT may be further located between the lower substrate 100 and the plurality of color filters 300.

Referring to FIG. 6, the display apparatus according to an exemplary embodiment may include a first column spacer 400' and a second column spacer 400". The second column spacer 400" may be located farther from a central axis CAX of the upper substrate 500 than the first column spacer 400'. The first column spacer 400' and the second column spacer 400" may extend in the second direction (e.g., the +x direction) as described above. The first column spacer 400' may have a first length W1 that extends in the second direction (e.g., the +x direction), and the second column spacer 400" may have a second length W2 that extends in the second direction (e.g., the +x direction). In an exemplary embodiment, the second length W2 of the second column spacer 400" may be greater than the first length W1 of the first column spacer 400'.

That is, lengths of the first column spacer 400' and the second column spacer 400" may increase away from the central axis CAX of the upper substrate 500. In this case, the term 'length' of the column spacer 400 may refer to a length that extends in the second direction (e.g., the +x direction). Also, the central axis CAX of the upper substrate 500 is parallel to the second bending axis BAX2 of the upper substrate 500 and may be defined as an axis that passes through the center of the upper substrate 500.

When the upper substrate 500 and the lower substrate 100 are bent as in an exemplary embodiment, the risk of misalignment between the upper substrate 500 and the lower substrate 100 increases away from the center, that is, the central axis CAX, of the upper substrate 500, and the center of the lower substrate 100. Accordingly, a length of each of the column spacers 400 located on the upper substrate 500 may increase away from the central axis CAX of the upper substrate 500 in the present embodiment.

As shown in FIG. 6, the first column spacer 400' relatively close to the central axis CAX has the first length W1, and the second column spacer 400" relatively far from the central axis CAX has the second length W2. In this case, the second length W2 of the second column spacer 400" may be greater than the first length W1 of the first column spacer 400'. Since the second length W2 of the second column spacer 400" is greater than the first length W1 of the first column spacer 400', the second column spacer 400" may have longer margin portions than those of the first column spacer 400'.

That is, as shown in FIG. 6, the first column spacer 400' may have a first portion w11 that overlaps the color filter 300 located under the first column spacer 400', and second portions w12 that do not overlap the color filter 300. The second column spacer 400" may have a first portion w21 that overlaps the color filter 300 located under the second column spacer 400", and second portions w22 that do not overlap the color filter 300. In this case, the first portion w11 of the first column spacer 400' and the first portion w21 of the second column spacer 400" may be the same. However, because the second length W2 of the second column spacer 400" is greater than the first length W1 of the first column spacer 400', the second portions w22 of the second column spacer 400" may be wider than the second portions w12 of the first column spacer 400'. Accordingly, when alignment of the upper substrate 500 and the lower substrate 100 shifts away from the central axis CAX, since the column spacer 400 has sufficient margin portions, misalignment between the supper substrate 500 and the lower substrate 100 may be minimized.

Figure 7:
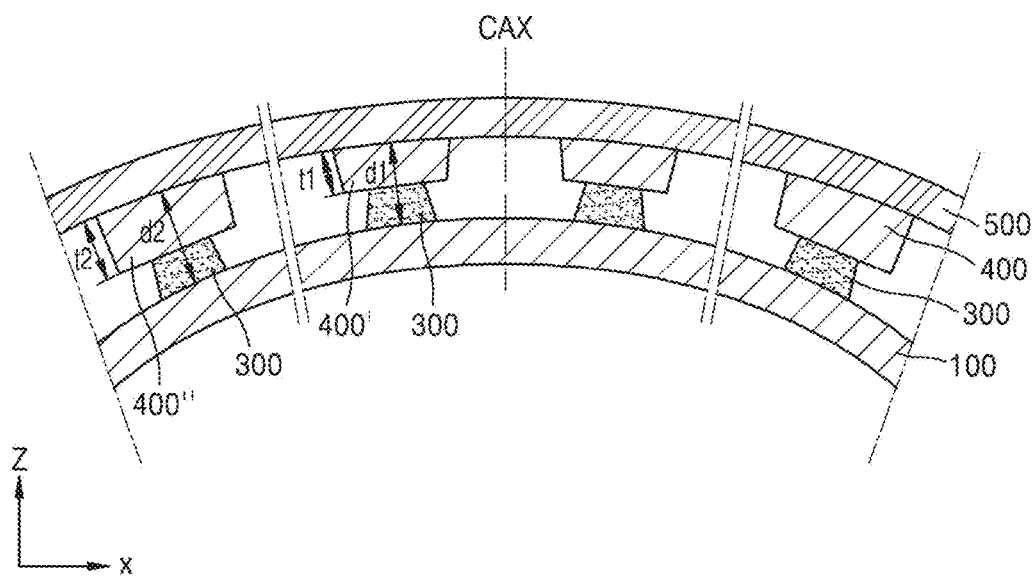
FIG. 7 is a cross-sectional view of the display apparatus of FIG. 1 according to an exemplary embodiment.

FIG. 7 is a cross-sectional view of the display apparatus of FIG. 1 according to an exemplary embodiment.

In FIG. 7, the display apparatus is curved. The plurality of column spacers 400 may be located on the upper substrate 500, and the plurality of color filters 300 may be located on the lower substrate 100. Although the plurality of color filters 300 are located directly on a top surface of the lower substrate 100 in FIG. 7, it will be understood that a device layer including various lines such as a TFT may be further located between the lower substrate 100 and the plurality of color filters 300.

Referring to FIG. 7, the display apparatus according to an exemplary embodiment may include the first column spacer 400' and the second column spacer 400". The second column spacer 400" may be farther from the central axis CAX of the upper substrate 500 than the first column spacer 400'.

In an exemplary embodiment, a distance between the lower substrate 100 and the upper substrate 500 may increase away from the central axis CAX of the upper substrate 500. Accordingly, a distance d2 between the lower substrate 100 and a portion of the upper substrate 500 on which the second column spacer 400" is located may be greater than a distance d1 between the lower substrate 100 and a portion of the upper substrate 500 on which the first column spacer 400' is located. This is results from a difference in curvature between the lower substrate 100 and the upper substrate 500, as described above.

The first column spacer 400' may have a first height t1, and the second column spacer 400" may have a second height t2. In an exemplary embodiment, the second height t2 of the second column spacer 400" may be greater than the first height t1 of the first column spacer 400'.

That is, heights of the first column spacer 400' and the second column spacer 400" may increase away from the central axis CAX of the upper substrate 500. In this case, the term 'height' of the column spacer 400 may refer to a thickness extending along a Z-axis direction. The central axis CAX of the upper substrate 500 that is parallel to the second bending axis BAX2 of the upper substrate 500 may be defined as an axis that passes through the center of the upper substrate 500.

In the display apparatus according to an exemplary embodiment, the upper substrate 500 and the lower substrate 100 have different curvatures as described above. In this case, a curvature of the lower substrate 100 is greater than a curvature of the upper substrate 500, and thus an interval between the upper substrate 500 and the lower substrate 100 increases away from the central axis CAX of the upper substrate 500. Accordingly, the distance d2 of the second column spacer 400" located farther from the central axis CAX of the upper substrate 500 may be greater than the distance d1 of the first column spacer 400' located closer to the central axis CAX of the upper substrate 500.

As described above, according to exemplary embodiments, a display apparatus that may simplify a process and may minimize a defect rate in a manufacturing process may be provided. However, the scope of the present disclosure is not so limited.

While the present disclosure has been particularly shown and described with reference to embodiments thereof, it will be understood by one of ordinary skill in the art that various changes in form and details may be made therein without departing from the spirit and scope of the present disclosure as defined by the following claims.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A display apparatus comprising:
    a lower substrate bent around a first bending axis that extends in a first direction;
    an upper substrate opposing the lower substrate and comprising a first surface facing the lower substrate;
    a pixel electrode disposed on the lower substrate;
    a color filter disposed on the lower substrate so as to correspond to the pixel electrode; and
    a first column spacer disposed on the first surface so as to correspond to at least a portion of the color filter and extending in a second direction that intersects the first direction, the first column spacer comprising a first portion that overlaps the color filter, and second portions that do not overlap the color filter; and
    an organic film disposed between the color filter and the first column spacer,
    wherein the first portion of the first of the first column spacer contacts the organic film.
2. The display apparatus of claim 1, wherein the pixel electrode extends in the first direction.
3. The display apparatus of claim 1, wherein the color filter comprises at least one of a red color filter, a blue color filter, a green color filter, and a white color filter.
4. The display apparatus of claim 1, wherein the color filter does not overlap at least a portion of the first column spacer.
5. The display apparatus of claim 1, wherein the first portion is located at a center of the first column spacer.
6. The display apparatus of claim 1, wherein the second portions are located at two sides of the first portion.
7. The display apparatus of claim 1, wherein the first direction and the second direction are perpendicular to each other.
8. The display apparatus of claim 7, wherein the upper substrate is bent around a second bending axis extending in a third direction that intersects the second direction.
9. The display apparatus of claim 8, wherein the third direction is parallel to the first direction.
10. The display apparatus of claim 8, wherein the lower substrate is bent according to a first curvature, and the upper substrate is bent according to a second curvature different from the first curvature.
11. The display apparatus of claim 10, wherein the first curvature of the lower substrate is greater than the second curvature of the upper substrate.
12. The display apparatus of claim 8, further comprising a second column spacer located farther from a central axis of the upper substrate than the first column spacer, the central axis of the upper substrate being parallel to the second bending axis,
    wherein a second height of the second column spacer is greater than a first height of the first column spacer.
13. A display apparatus comprising:
    a lower substrate bent around a first bending axis that extends in a first direction;
    an upper substrate opposing the lower substrate and comprising a first surface facing the lower substrate;
    a pixel electrode disposed on the lower substrate;
    a color filter disposed on the lower substrate so as to correspond to the pixel electrode; and
    a first column spacer disposed on the first surface so as to correspond to at least a portion of the color filter and extending in a second direction perpendicular to the first direction, wherein the upper substrate is bent around a second bending axis extending in a third direction that intersects the second direction; and
    a second column spacer located farther from a central axis of the upper substrate than the first column spacer, the central axis of the upper substrate being parallel to the second bending axis,
    wherein a second length of the second column spacer in the second direction is greater than a first length of the first column spacer in the second direction.

* * * * *